United States Patent
Kim et al.

(10) Patent No.: US 9,818,186 B2
(45) Date of Patent: Nov. 14, 2017

(54) METHOD FOR FORMING 3D MAXILLOFACIAL MODEL BY AUTOMATICALLY SEGMENTING MEDICAL IMAGE, AUTOMATIC IMAGE SEGMENTATION AND MODEL FORMATION SERVER PERFORMING THE SAME, AND STORAGE MEDIUM STORING THE SAME

(71) Applicant: Korea Institute of Science and Technology, Seoul (KR)

(72) Inventors: Sun Hee Kim, Seoul (KR); Young Jun Kim, Seoul (KR); Lae Hyun Kim, Seoul (KR); Deuk Hee Lee, Seoul (KR); Se Hyung Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/264,311

(22) Filed: Sep. 13, 2016

(65) Prior Publication Data
US 2017/0084026 A1    Mar. 23, 2017

(30) Foreign Application Priority Data
Sep. 21, 2015   (KR) .................. 10-2015-0132843

(51) Int. Cl.
*G06K 9/00*    (2006.01)
*G06T 7/00*    (2017.01)
(Continued)

(52) U.S. Cl.
CPC .............. *G06T 7/0012* (2013.01); *G06T 7/11* (2017.01); *G06T 17/10* (2013.01);
(Continued)

(58) Field of Classification Search
None
See application file for complete search history.

(56) References Cited

U.S. PATENT DOCUMENTS

| | | | |
|---|---|---|---|
| 2012/0063655 A1* | 3/2012 | Dean | G06F 19/321 382/128 |
| 2014/0003695 A1* | 1/2014 | Dean | G06T 7/0012 382/131 |
| 2017/0018088 A1* | 1/2017 | Jeong | G06T 15/04 |

FOREIGN PATENT DOCUMENTS

KR    10-2006-0028044 A    3/2006

* cited by examiner

*Primary Examiner* — Atiba O Fitzpatrick
(74) *Attorney, Agent, or Firm* — NSIP Law

(57) ABSTRACT

Disclosed is a method for forming a three-dimensional (3D) model of skin and mandible by automatic medical image segmentation which is performed in an automatic image segmentation and model formation server. The method includes (a) receiving 3D medical image data that is a set of two-dimensional (2D) images for horizontal planes of a face, (b) obtaining a contrast histogram based on distribution of contrasts of the 3D medical image data, and segmenting the 3D medical image data for the face into multiple regions separated into at least one partial region based on the contrast histogram, (c) extracting only the face by removing portions other than the face from the multiple regions for the face, and extracting a skin region of the face, (d) extracting the mandible from each of the 2D images for the horizontal planes of the face through a 2D detailed segmentation technique using an active contour method based on a level set function, and (e) reconstructing the extracted skin region and mandible as the 3D model.

21 Claims, 17 Drawing Sheets

(51) Int. Cl.
*G06T 17/10* (2006.01)
*G06T 7/11* (2017.01)
(52) U.S. Cl.
CPC ............... *G06T 2207/10004* (2013.01); *G06T 2207/30008* (2013.01); *G06T 2207/30201* (2013.01); *G06T 2210/41* (2013.01)

HORIZONTAL PLANE IMAGE

CORONAL PLANE IMAGE

SAGITTAL PLANE IMAGE

ORIGINAL IMAGE

MULTI-SEGMENTED IMAGE

FIG.13
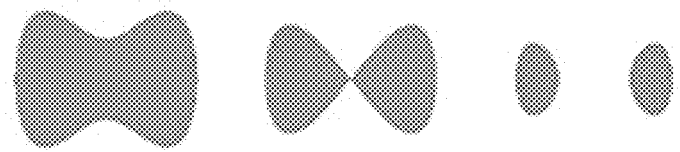
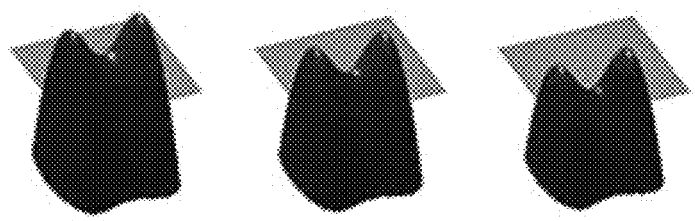
FIG. 14
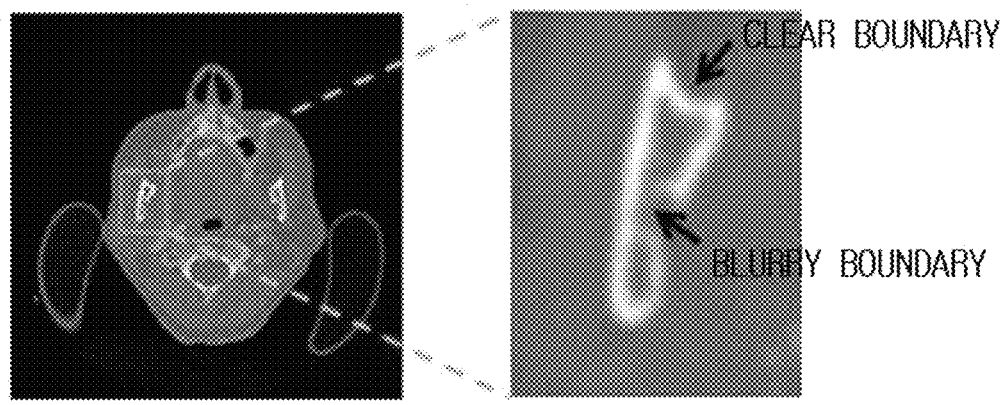

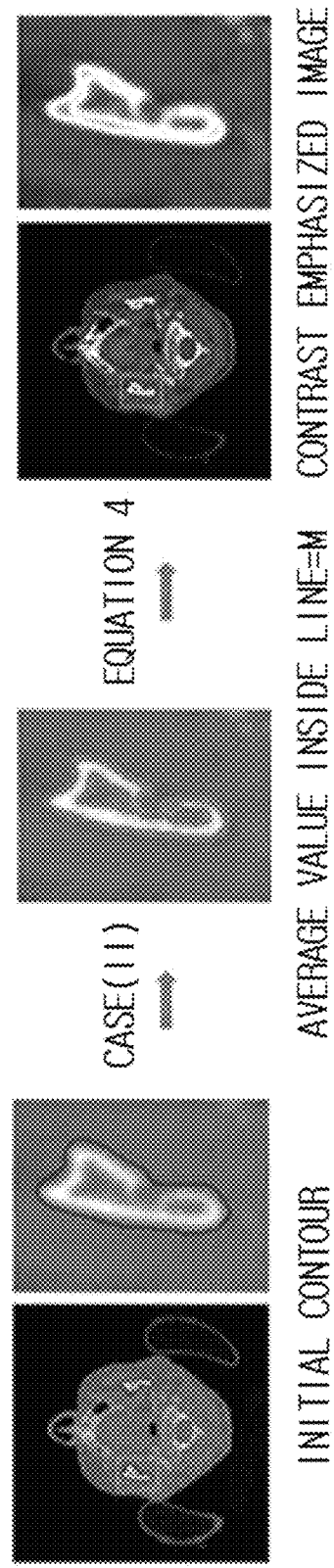

FIG. 16A
FIG. 16B
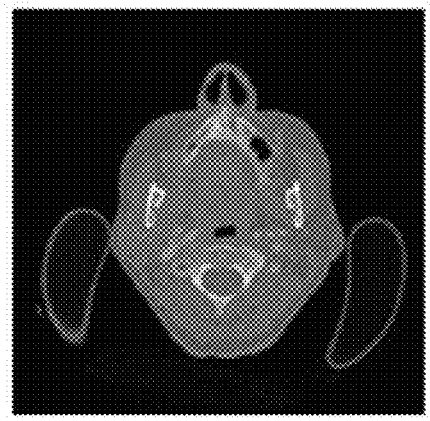
ORIGINAL IMAGE
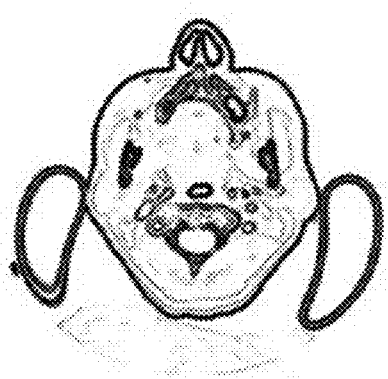
EDGE IMAGE

ORIGINAL IMAGE    CONVENTIONAL METHOD    PROPOSED METHOD

CONVENTIONAL METHOD  PROPOSED METHOD    CONVENTIONAL METHOD  PROPOSED METHOD
BEFORE SMOOTHING                        AFTER SMOOTHING

METHOD FOR FORMING 3D MAXILLOFACIAL MODEL BY AUTOMATICALLY SEGMENTING MEDICAL IMAGE, AUTOMATIC IMAGE SEGMENTATION AND MODEL FORMATION SERVER PERFORMING THE SAME, AND STORAGE MEDIUM STORING THE SAME

CROSS-REFERENCE TO RELATED APPLICATION

This application claims priority to and the benefit of Korean Patent Application No. 2015-0132843, filed on Sep. 21, 2015, the disclosure of which is incorporated herein by reference in its entirety.

BACKGROUND

1. Field of the Invention

The present invention relates to a technology for forming a three-dimensional (3D) model of skin and mandible by automatic image segmentation, and more particularly, to a method for forming a 3D maxillofacial model by automatic medical image segmentation, which may rapidly and efficiently form a 3D model of skin and mandible by combining a macroscopic 3D multi-segmentation technique and 2D detailed segmentation technique, an automatic image segmentation and model formation server performing the same, and a storage medium storing the same.

2. Discussion of Related Art

The mandible is a bone that is mainly used to chew food and an important portion to hold the contours of the face. In the mandible, orthognathic surgery is carried out for mainly cosmetic purposes, and mandibular fracture surgery due to trauma and mandibular resection due to cancer are carried out. In a case of reconstructive surgery other than a cosmetic purpose, when a surgery to replace the mandible using the fibula of a patient is carried out, soft tissue removal and ostectomy are carried out together with several departments such as dentistry, otolaryngology, surgery, and the like, and the reconstructive surgery is one of surgeries with a high level of difficulty which takes more than 10 hours. As a method for increasing the success rate of such a surgery with the high level of difficulty and reducing the operation time, three-dimensional (3D) virtual surgical planning techniques have been recently tried. In the prior art, a doctor directly performs a manual image segmentation work for modeling a human body part that is required during a surgery, and therefore a period of about a week or more to plan the surgery has been spent and such a manual modeling results in a decrease in interobserver agreement.

In addition, in Korea Patent Publication No. 10-2006-0028044 which relates to a 3D finite element modeling method using two-dimensional (2D) medical images and a storage medium, a method of performing computer simulation by configuring a 3D shape model has been disclosed. However, as the specific method thereof, an object and a background are separated from the 2D medical images, the 2D images from which the background is separated are stacked, and then the outlines of the stacked images are connected to each other to form a 3D shape model whose inside is empty, and the 3D shape model whose volume is filled with triangular pyramid-shaped tetrahedron elements is finally generated by adjusting the accuracy of the 3D shape model, so that the 3D shape model is generated only through a process of separating the background and the object, and therefore a difference between an actual structure of the object and the generated 3D shape model may occur. In this case, it may be unsuitable to establish a surgical plan, and therefore the above-described problem still exists.

Therefore, there is a demand for an automatic segmentation based-3D modeling technique for efficient and stable surgical plan and simulation.

PRIOR ART DOCUMENT

Patent Document

[Patent Document 1] Korea Patent Publication No. 10-2006-0028044

SUMMARY OF THE INVENTION

The present invention is directed to a method for forming a three-dimensional (3D) maxillofacial model by automatic medical image segmentation, which may automatically segment the skin and mandible of a patient by combining a multi-segmentation method and a detailed segmentation method using a level set function and generate a 3D model, and thereby may help to establish more accurate and efficient surgical plan and obtain a uniform mandibular model of the patient, an automatic image segmentation and model formation server performing the same, and a storage medium storing the same.

The present invention is also directed to a method for forming a 3D maxillofacial model by automatic medical image segmentation, which may be performed at a high speed while overcoming difficulties in the segmentation due to irregularities in boundaries caused by high and low contrasts, an automatic image segmentation and model formation server performing the same, and a storage medium storing the same.

According to an aspect of the present invention, there is provided a method for forming a three-dimensional (3D) model of skin and mandible by automatic medical image segmentation which is performed in an automatic image segmentation and model formation server, including: (a) receiving 3D medical image data that is a set of two-dimensional (2D) images for horizontal planes of a face; (b) obtaining a contrast histogram based on distribution of contrasts of the 3D medical image data, and segmenting the 3D medical image data for the face into multiple regions separated into at least one partial region based on the contrast histogram; (c) extracting only the face by removing portions other than the face from the multiple regions for the face, and extracting a skin region of the face; (d) extracting the mandible from each of the 2D images for the horizontal planes of the face through a 2D detailed segmentation technique using an active contour method based on a level set function; and (e) reconstructing the extracted skin region and mandible as the 3D model.

Preferably, the (b) obtaining of the contrast histogram may include dividing a range of the contrast into predetermined levels, and calculating the number of pixels having the contrast corresponding to each of the levels from the 3D medical image data for the face to thereby obtain the contrast histogram.

Preferably, the (b) obtaining of the contrast histogram may further include extracting, from the contrast histogram, a partial region having a peak satisfying a specific criterion using an AGMC (adaptive global maximum clustering) technique.

Preferably, the (b) obtaining of the contrast histogram may further include segmenting the 3D medical image data into the multiple regions based on an average value of the contrast histogram of the partial region.

Preferably, the (c) extracting of only the face and the skin region thereof may include obtaining a face candidate region by binarizing the multiple regions according to label values of the multiple regions.

Preferably, the (c) extracting of only the face and the skin region thereof may further include eroding the face candidate region using a circular structural element having a radius value set based on a size of the face candidate region or a preset radius value.

Preferably, the (c) extracting of only the face and the skin region thereof may further include restricting an erosion region reaching from a center of the face candidate region to positions laterally away from each other by a preset length.

Preferably, the (c) extracting of only the face and the skin region thereof may further include extracting a connection component having a common portion with the erosion region, and expanding the erosion region using the circular structural element.

Preferably, the (d) extracting of the mandible may include selecting a sample image from the 2D images, and extracting the mandible from the sample image that is a segmentation result for the sample image Preferably, the (d) extracting of the mandible may further include setting an initial contour of an image next to or prior to the sample image based on a contour for a segmentation result of the sample image.

Preferably, the (d) extracting of the mandible may further include emphasizing a contrast of the mandible based on contrast information about the mandible inside the initial contour.

Preferably, the (d) extracting of the mandible may further include stopping movement of the contour when the initial contour moves and reaches a boundary of the mandible.

Preferably, the (d) extracting of the mandible may further include the contour moving based on an average value of local contrasts of the inside and outside of the contour and a curvature of the contour.

Preferably, the (e) reconstructing of the extracted skin region and mandible may include reconstructing the extracted skin region and mandible as the 3D model using a surface rendering algorithm, and processing a surface of the 3D model using an HC-Laplacian algorithm Preferably, the 3D medical image data may be CBCT (cone beam computed tomography) image data.

Preferably, the segmented multiple regions may be labeled according to contrasts of the multiple regions.

According to another aspect of the present invention, there is provided an automatic image segmentation and model formation server which performs a method for forming a 3D maxillofacial model by automatic medical image segmentation, including: an image data reception unit that receives 3D medical image data that is a set of 2D images for horizontal planes of a face; a multi-region segmentation unit that obtains a contrast histogram based on distribution of contrasts of the 3D medical image data, and segments the 3D medical image data for the face into multiple regions separated into at least one partial region based on the contrast histogram; a purpose region segmentation unit that includes a skin detailed segmentation module for extracting only the face by removing portions other than the face from the multiple regions for the face and extracting a skin region of the face, and a mandible detailed segmentation module for extracting the mandible from each of the 2D images for the horizontal planes of the face through a 2D detailed segmentation technique using an active contour method based on a level set function; and a 3D reconstruction unit that reconstructs the extracted skin region and mandible as the 3D model.

Preferably, the multi-region segmentation unit may obtain the contrast histogram about the 3D medical image data, and segment the 3D medical image data into the multiple regions based on an average value of the contrast histogram of a partial region having a peak satisfying a specific criterion in the contrast histogram.

Preferably, the skin detailed segmentation module may obtain a face candidate region from the multiple regions, erode the face candidate region using a circular structural element based on a size of the face candidate region, restrict an erosion region based on a length of the face candidate region, extract a connection component having a common portion with the erosion region, and expand the erosion region using the circular structural element.

Preferably, the mandible detailed segmentation module may segment in detail an image next to or prior to a sample image based on a contour for a segmentation result of the sample image among the 2D images to thereby extract the mandible.

According to still another aspect of the present invention, there is provided a recording medium that records a program for executing a method for forming a 3D maxillofacial model by the above-described automatic medical image segmentation.

The method for forming the 3D maxillofacial model by automatic medical image segmentation according to the present invention may be implemented by a computer-readable code on a computer-readable recording medium. The computer-readable recording medium includes all of recording devices that store computer-readable data.

For example, the computer-readable recording medium may be a ROM, a RAM, a CD-ROM, a magnetic tape, a hard disk, a floppy disk, a mobile storage device, a non-volatile memory (flash memory), an optical data storage device, and the like.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 13 is a diagram illustrating a phase change of a level set method;

FIG. 14 is an example of a target simultaneously having clear boundaries and blurry boundaries;

FIG. 15 is an example of a process of acquiring a contrast-enhancing image of a target;

FIGS. 16A-16B is an example of an edge indicator function;

DETAILED DESCRIPTION OF EXEMPLARY EMBODIMENTS

Figure 1:
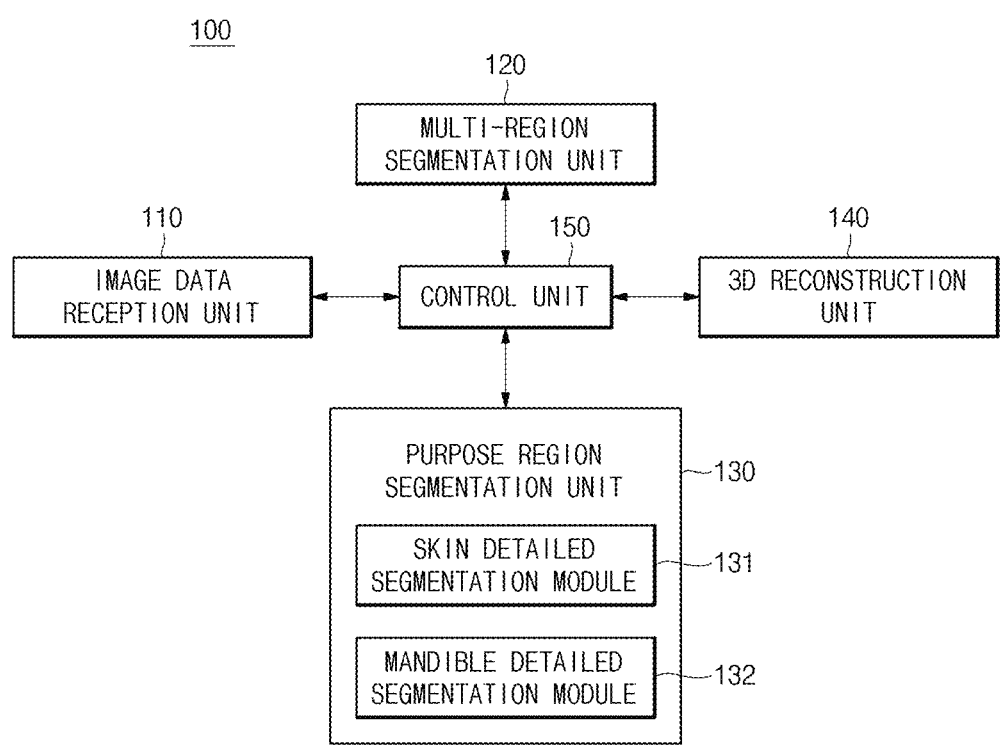
FIG. 1 is a block diagram illustrating an automatic image segmentation and model formation server according to an embodiment of the present invention.

Advantages and features of the present invention and a method for achieving the same will become explicit by referring to the exemplary embodiments that are described in detail in the following with reference to the accompanying drawings. However, the present invention is not limited to the exemplary embodiments disclosed in the following and thus, may be configured in various forms. Here, the present exemplary embodiments are provided to make the disclosure of the present invention perfect and to completely inform those skilled in the art about the scope of the present invention. The present invention is defined by the scope of claims. Like numbers refer to like elements throughout the description of the figures. As used herein, the term "and/or" includes any and all combinations of one or more of the associated listed items.

Although the terms first, second, etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present invention.

In addition, reference characters (for example, a, b, c, etc.) related to steps are used for convenience of description, and are not intended to describe the sequence of the steps. The steps may occur in different sequences, as long as a specific sequence is not specifically described in the context. That is, the steps may occur in a specified sequence, may occur simultaneously, or may be performed in the reverse sequence.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Also, if it is determined that a specific description of the related and noticed functions or structures may obscure the gist of the present invention, the specific description will be omitted. In addition, terms are to be described later which may vary according to the custom or intention of users or operators as the terms defined in consideration of functions in the present invention. Therefore, definition of the terms should be made based on the contents throughout the specification.

FIG. 1 is a block diagram illustrating an automatic image segmentation and model formation server according to an embodiment of the present invention.

Referring to FIG. 1, an automatic image segmentation and model formation server 100 according to an embodiment of the present invention includes an image data reception unit 110, a multi-region segmentation unit 120, a purpose region segmentation unit 130, a three-dimensional (3D) reconstruction unit 140, and a control unit 150, and the purpose region segmentation unit 130 includes a skin detailed segmentation module 131 and a mandible detailed segmentation module 132.

Figure 3A:
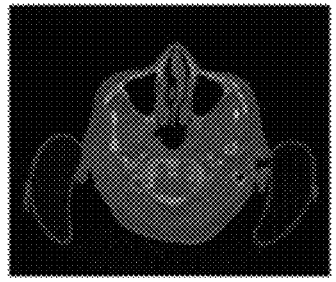
FIGS. 3A-3C is an example of 3D medical image data.
Figure 3B:
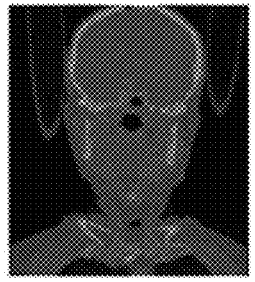
Figure 3C:
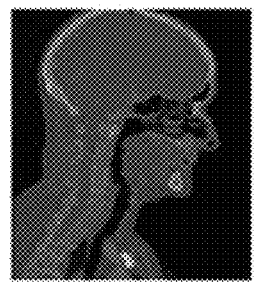

The image data reception unit 110 receives 3D medial image data that is a set of two-dimensional (2D) images. According to an embodiment of the present invention, the image data reception unit 110 may receive a 3D CBCT (cone beam computed tomography) image, and for example, referring to FIGS. 3A-3C, the image data reception unit 110 may receive CBCT images for 3A a horizontal plane image, 3B a coronal plane image, and 3C a sagittal plane image.

The multi-region segmentation unit 120 obtains a contrast histogram for the contrast of the 3D medical image data, and segments the 3D medical image data into multiple regions based on the contrast histogram.

Figure 4A:
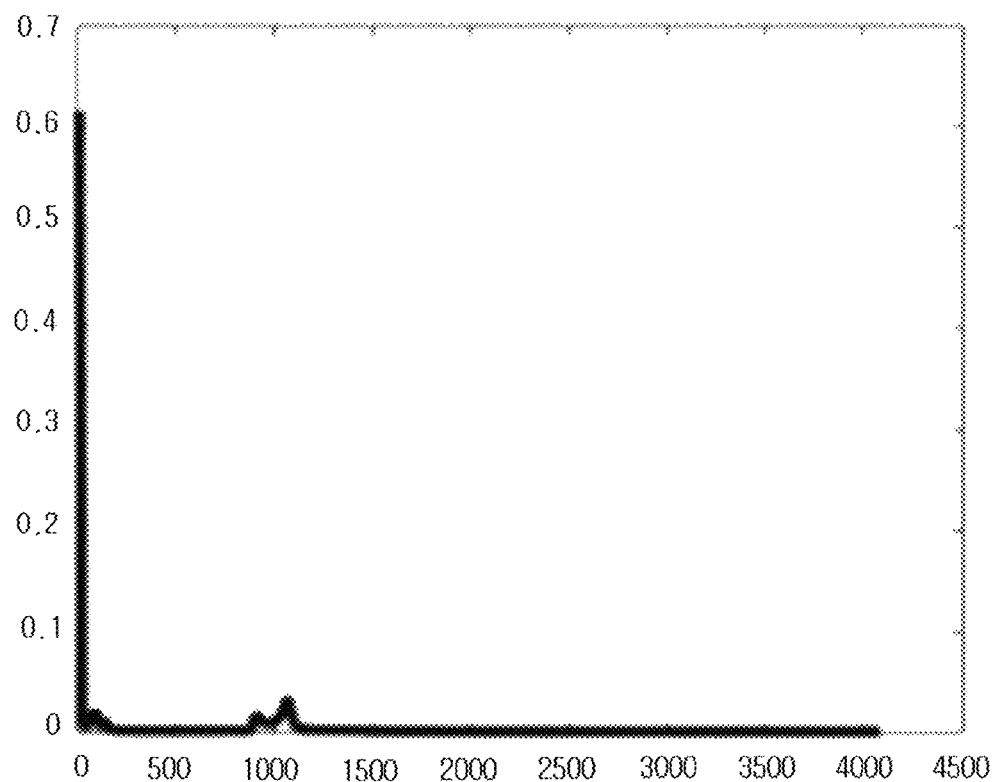
FIGS. 4A-4B is an example of a contrast histogram.
Figure 4B:
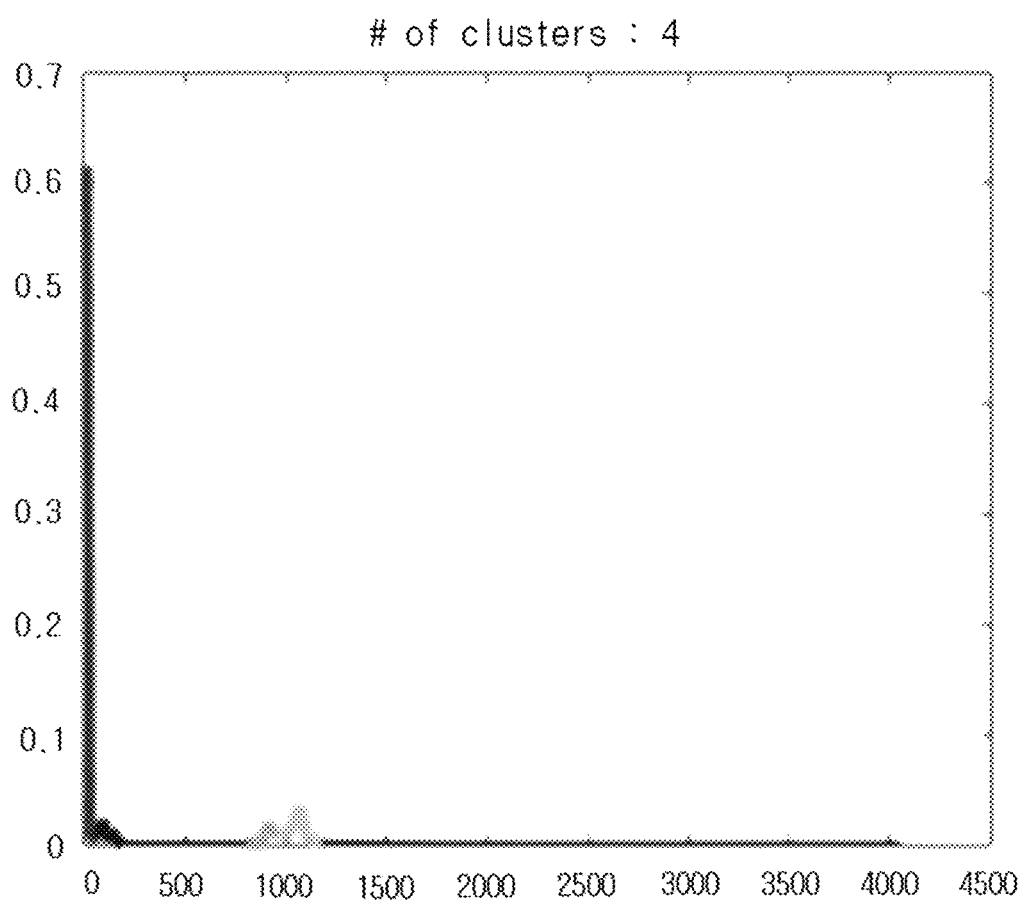

More specifically, the multi-region segmentation unit 120 divides a range of the contrast into 256 levels as shown in FIG. 4A, and calculates the number of pixels having the contrast corresponding to each level from the 3D medical image data, and thereby obtains the contrast histogram. Next, the multi-region segmentation unit 120 extracts, from the contrast histogram, a partial region having a peak satisfying a specific criterion, that is, a meaningful peak using an AGMC (adaptive global maximum clustering) technique. For example, referring to FIG. 4B, four partial regions having colors such as red, blue, yellow green, and blue sky may be extracted from the contrast histogram of FIG. 4A.

Figure 5A:
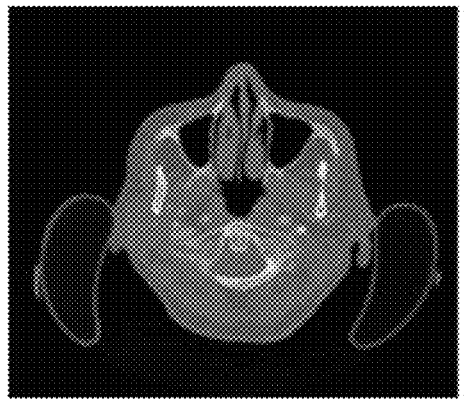
FIGS. 5A-5B is an example of results of multi-region segmentation.
Figure 5B:
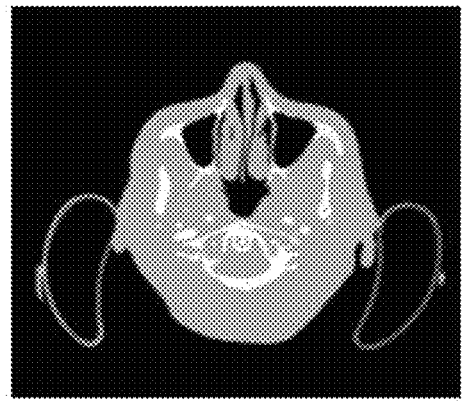

The multi-region segmentation unit 120 may segment the 3D medical image data into multiple regions based on an average value of the contrast histogram of each partial region, and referring to FIG. 5, the 3D medical image data segmented into the multiple regions as shown in FIG. 5B may be obtained from an original image that is FIG. 5A through the multi-region segmentation unit 120.

The skin detailed segmentation module of the purpose region segmentation unit 130 extracts a skin region by morphologically processing the multiple regions. Hereinafter, a skin detailed segmentation process using a morphological technique which is performed in the purpose region segmentation unit 130 will be described with reference to FIG. 6.

<Skin Detailed Segmentation—Morphological Technique>

Figure 6:
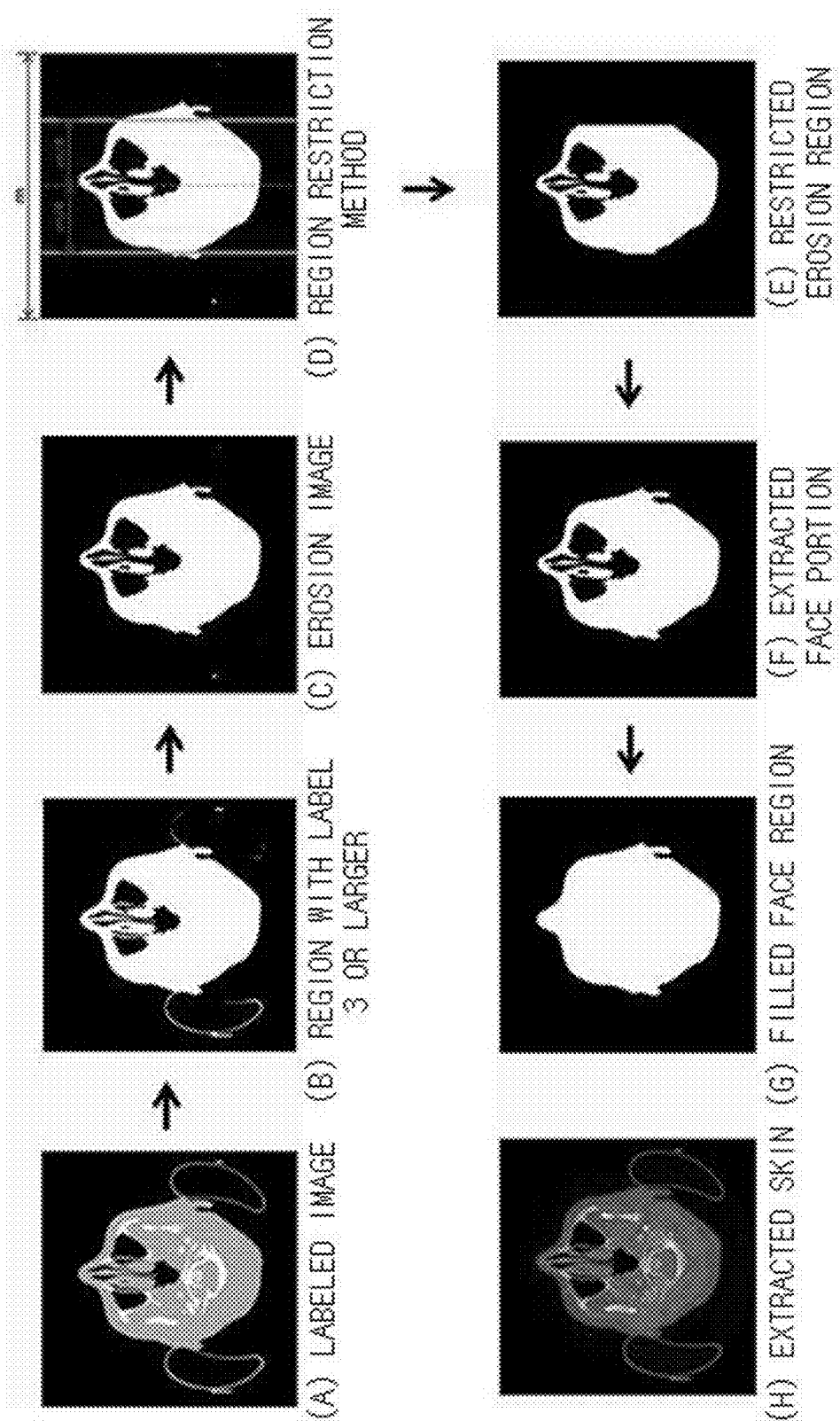
FIG. 6 is an example of a skin detailed segmentation process.

① As shown in (a) of FIG. 6, as multi-segmentation results of 3D medical image data, a given region may be labeled and a face candidate region may be obtained by binarizing the given region on the basis of a label value, as shown in (b) of FIG. 6. For example, the given regions as the multi-segmentation results may be labeled as values of 1, 2, 3, and 4, and regions having a label value of 3 or larger may be all binarized into a white color, and the remaining regions may be all binarized into a black color.

② In order to remove a portion that does not correspond to an actual facial region from the binarized image, an erosion image as shown in (c) of FIG. 6 may be obtained by eroding an image using a circular structural element. For example, as shown in (b) of FIG. 6, a tool which is used when measuring the corresponding image as well as the actual facial region may be also observed as a white thin strip shape on the both sides from the erosion image, so that the erosion image may be obtained using the circular structural element having a radius value set based on the size of the face candidate region or a preset radius value in order to remove the white thin stripe shape. Here, other shapes other than the circular shape may be possible as the shape of the structural element. Through this, there is an effect capable of removing unnecessary elements thinly connected to the face.

③ In order to further remove elements other than the face, which are not completely removed from the erosion image, an image of a restricted erosion region as shown in (e) of FIG. 6 may be obtained by applying a region restriction method as shown in (d) of FIG. 6. Here, the region restriction method may be applied according to the position or distribution of the face candidate region in the corresponding image and a region restriction value may be set. For example, as shown in (d) of FIG. 6, the face candidate region is distributed in the center of the image, and therefore an erosion region is restricted from the center of an X-axis of the image up to a place separated away in both directions by ¼ (a region restriction value) of the total width of the image so that the restricted erosion region may be obtained as shown in (e) of FIG. 6.

④ The actual facial region may be obtained by extracting only connection components having a common portion with the restricted erosion region from the erosion image. That is, the actual facial region as shown in (f) of FIG. 6 is obtained by extracting only connection components having a common portion with (e) of FIG. 6 from (c) of FIG. 6. From (f) of FIG. 6, it can be seen that only the facial region from which a tool which is used when measuring the corresponding image and appears on the left and right sides of (c) of FIG. 6 is removed is extracted.

⑤ The extracted facial region may have a reduced shape compared to a face surface of an original image since it is obtained from the erosion image eroded in step ②, so that in order to restore this, an expansion operation may be performed using the same structural element used in step ②, and then the inside of the erosion image may be filled to extract only the face surface as shown in (g) of FIG. 6.

⑥ In order to smooth the boundary of the facial region, an extracted skin may be obtained as shown in (h) of FIG. 6 by applying Gaussian smoothing to (g) of FIG. 6. For example, Gaussian smoothing that satisfies σ=2 may be applied.

Figure 7:
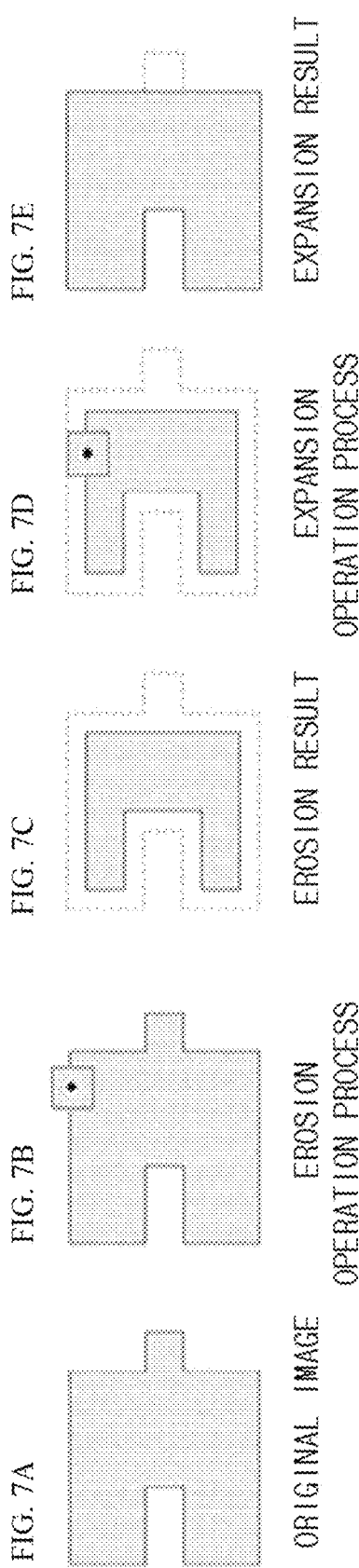
FIGS. 7A-7E is an example of an erosion and expansion operation.

Hereinafter, an erosion operation and an expansion operation of steps ② and ⑤ will be described in more detail with reference to FIG. 7.

Erosion and Expansion Operations *

When the center of the structural element is positioned in the boundary of the original image along the boundary of the original image, it may be classified into the erosion operation and the expansion operation according to the following cases.

Remove a portion in which the intersection exists: erosion operation

Add a portion in which the structural element is out of the original image: expansion operation When the erosion operation and the expansion operation are sequentially performed using such a structural element that is , the size of the original image may be restored while regions smaller than the corresponding structural element are removed, as shown from FIG. 7A to FIG. 7E.

The mandible detailed segmentation module 132 of the purpose region segmentation unit 130 automatically extracts the mandible through a two-dimensional (2D) detailed segmentation technique using an active contour method based on a level set function with respect to each of 2D images.

3D medical image data may be represented as a set $\{I_k\}_k^K=1$ of 2D images as below, and the procedure for segmenting the mandible in detail may be divided into three steps as follows:

(i) Step of extracting mandible from sample image $k_s$ $I_{k_s}$: sample image→$u_{k_s}$: mandibular image (ii) Step of applying 2D detailed segmentation technique to each image in forward direction ($k_s+1→K$)

$I_{k_s}+1$ ($k_s+1$)-th image→$u_{k_s}+1$ ($k_s+1$)-th mandibular image
$I_{k_s}+2$ ($k_s+2$)-th image→$u_{k_s}+2$ ($k_s+2$)-th mandibular image
. . .
$I_K$ K-th image→$u_K$ K-th mandibular image (iii) Step of applying 2D detailed segmentation technique to each image in backward direction ($k_s-1→1$)

$I_{k_s}-1$ ($k_s-1$)-th image→$u_{k_s}-1$ ($k_s-1$)-th mandibular image
$I_{k_s}-2$ ($k_s-2$)-th image→$u_{k_s}-2$ ($k_s-2$)-th mandibular image
. . .
$I_1$ 1st image→$u_1$ 1st mandibular image Hereinafter, each step will be described in detail with reference to FIGS. 8 to 10.

(i) Step of extracting mandible from sample image $k_s$

Figure 8:
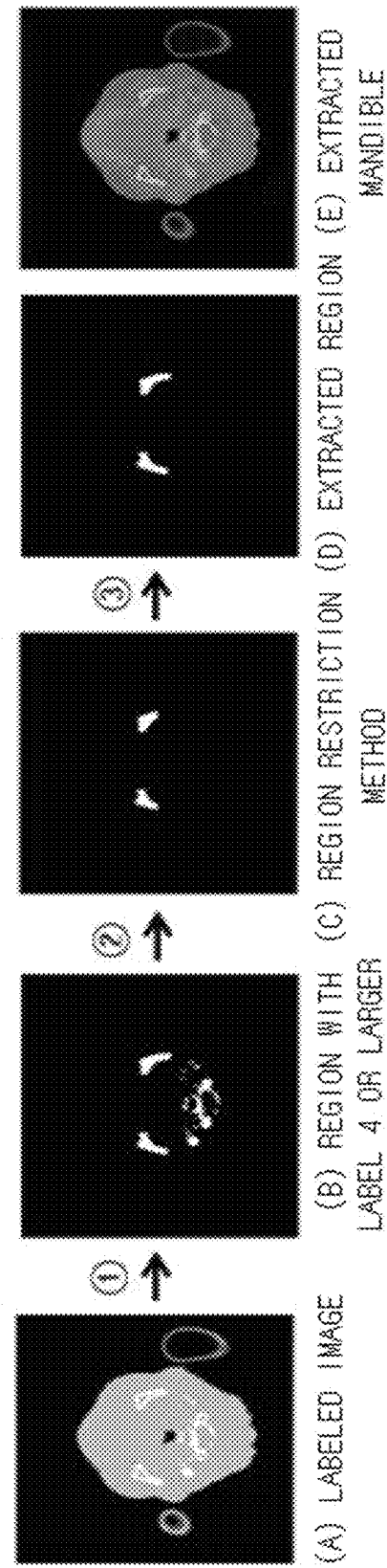
FIG. 8 is an example of a process of extracting a mandible from a sample image.

Referring to FIG. 8, a sample image is first selected (for example, $k_s$=60) (see (a) of FIG. 8), and regions having a label value of 4 or larger are selected from a labeling image of the sample image (see (b) of FIG. 8). In order to remove a bone portion other than the mandible, only an upper portion of a center portion of a y-axis of the corresponding image is selected (see (c) of FIG. 8). Only a connection component having a common portion with the bone portion is extracted from a restricted region (see (d) of FIG. 8). The mandible $u_{k_s}$ for the finally extracted sample image is shown as a red line of (e) of FIG. 8.

(ii) Step of applying 2D detailed segmentation technique to each image in forward direction ($k_s+1→K$)

① For the unity of a range on contrasts of all images, a range of a contrast of a given image is scaled into [0, 1].

Figure 9:
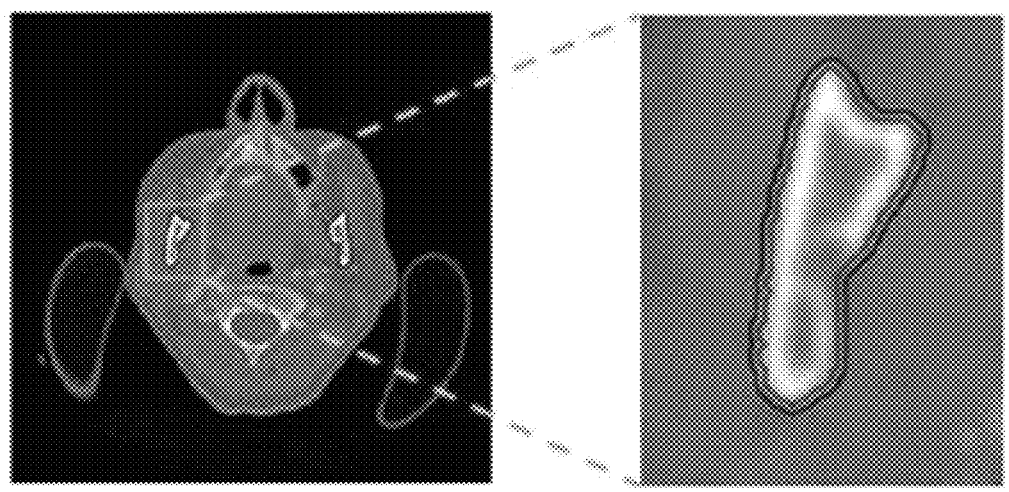
FIG. 9 is an example of initial contour setting.

② An initial level set function for ($k_s+1$)-th image segmentation is defined as $u_{k_s+1}^0=u_{k_s}+C$ (C≥0) using $u_{k_s}$ that is a segmentation result of the sample image. For example, C=2 may be satisfied, and adding a constant C may mean that a contour that is expanded by C in an outward direction from a contour indicating a previous mandible result is used as an initial contour for a current image. Since a thickness between upper and lower images is small in the 3D medical image data, the position of a target within each image is not significantly changed, so that it may make initial contour automatic prediction possible through expansion and contraction of the previous result. FIG. 9 is an example of initial contour setting, and in FIG. 9, a red line indicates a segmentation result of a previous image and a blue line indicates an initial contour of a current image and has a distance difference by C with the segmentation result of the previous image.

Figure 10:
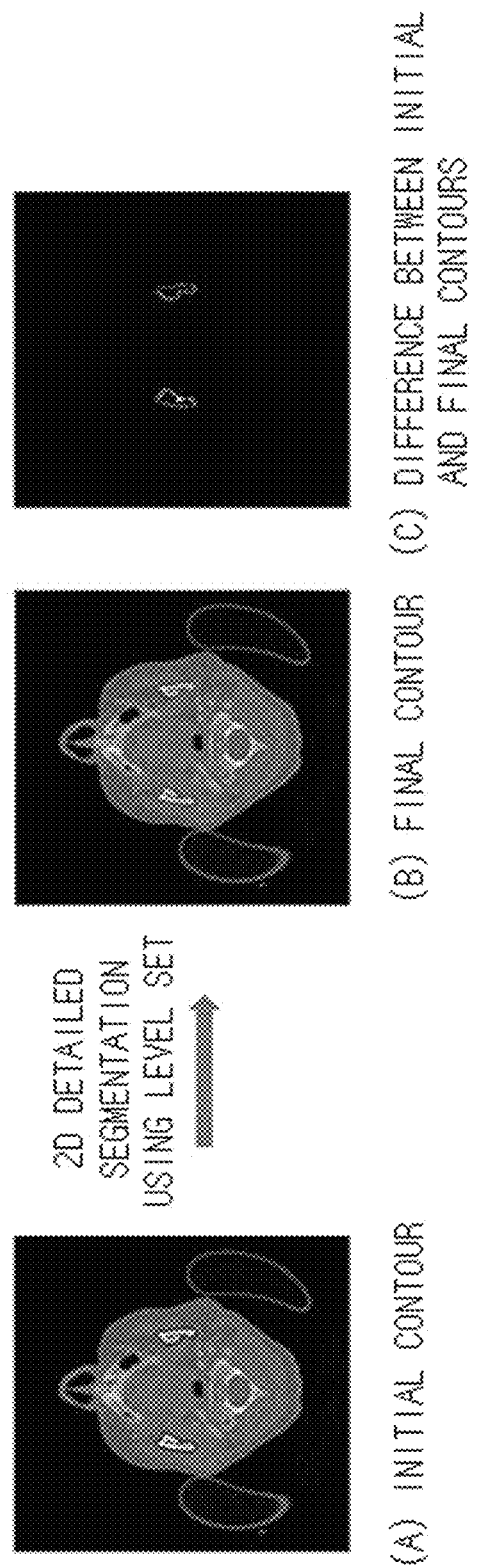
FIG. 10 is an example of two-dimensional (2D) detailed segmentation using a level set function.
Figure 11:
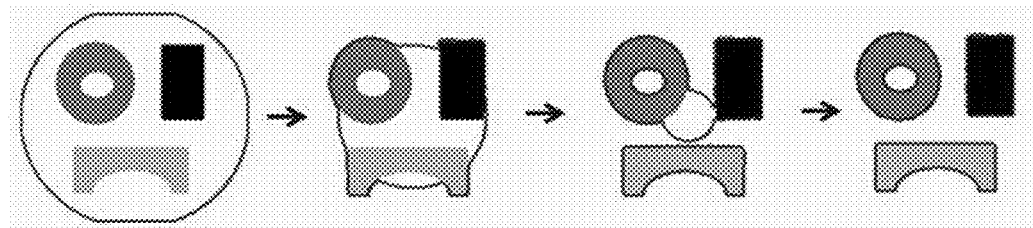
FIG. 11 is an example of segmentation by an active contour.
Figure 12:
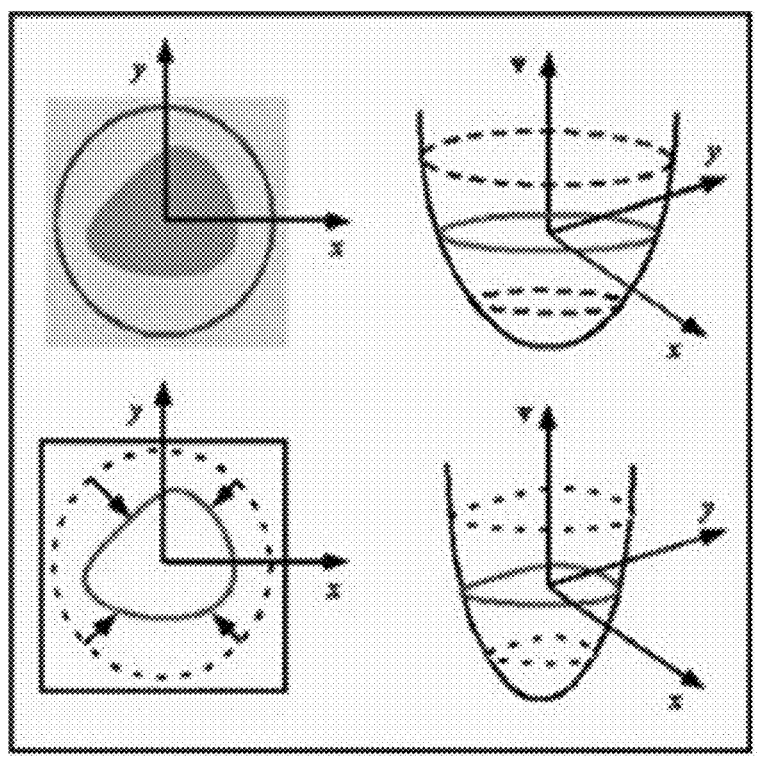
FIG. 12 is a diagram illustrating a relationship between a contour and a level set function.

③ By applying the 2D detailed segmentation technique using an $(k_s+1)$-th image $I_{k_s+1}$ and an initial level set function $u_{k_s+1}^0$, a $(k_s+1)$-th mandibular image $u_{k_s+1}$ that is a final level set function that represents the mandible as 0-level as shown in FIG. 10 may be obtained.

④ An initial level set function for a $(k_s+2)$-th image $I_{k_s+2}$ is defined as $u_{k_s+2}^0 = u_{k_s+1} + C$ in the same manner as in step ②, and a $(k_s+2)$-th mandibular image $u_{k_s+2}$ may be obtained by performing the 2D detailed segmentation technique in the same manner as in step ③. That is, by performing steps ② and ③ on the following image, each mandibular image may be sequentially obtained. The corresponding detailed segmentation is repeated with an increment up to a K-th image, and automatically stops at the number of an image in which the initial contour disappears.

(iii) Step of applying 2D detailed segmentation technique to each image in backward direction ($k_s-1 \rightarrow 1$)

In step (ii), detailed segmentation has been performed in a direction of an increase in a value of k, and in step (iii), detailed segmentation is performed in a direction of a reduction of the value of k to obtain each mandibular image by performing the process of step (ii). At this point, the detailed segmentation is repeated with a decrement up to a (k=1)-th image and automatically stops at the number of an image in which the initial contour disappears.

Hereinafter, the 2D detailed segmentation technique used in steps (ii) and (iii) will be described in more detail with reference to FIGS. 11 to 16.

<2D Detailed Segmentation Technique>

The 2D detailed segmentation technique is a useful method in a case in which a target within an image simultaneously has clear boundaries and blurry boundaries due to co-existence of bright and dark contrasts. This is a method (see FIG. 11) which makes an initial contour stop when the initial contour reaches the boundary of the target by moving the initial contour, as an active contour based-segmentation method. A level set method is used so as to make it free in phase changes of the initial contour and a target contour, and in the level set method, the movement of the corresponding contour is described through a level set function by introducing a higher-level function (level set function) capable of representing the corresponding contour as 0-level set (see FIG. 12). As shown in FIG. 13, the level set method has an advantage capable of describing various phases from a single level set function.

When $I: \Omega \subset \mathbb{R}^2 \rightarrow \mathbb{R}$ is a given image, the corresponding contour may be described in a level set form as follows:

$$\phi_0(X) = \begin{cases} d(X, C_0) & \text{inside}(C_0) \\ -d(X, C_0) & \text{outside}(C_0) \end{cases},$$ [Equation 1]

$C_0 = \{Y: \phi_0(Y) = 0\}$ is an initial contour.

Here, $d(X,Y) = \sqrt{(x_1-y_1)^2 + (x_2-y_2)^2}$, for $X=(x_1,x_2)$ and $Y=(y_1,y_2)$ denotes an Euclidean distance, and therefore Equation 1 becomes a signed distance function. In the segmentation method using the level set function, a final level set function that represents the boundary of the target as 0-level may be obtained by deforming the level set function using a defined force in order to segment such an initial level set function. The purpose of detailed segmentation using the level set function in the present invention is to properly find blurry boundaries as well as clear boundaries when the target simultaneously has clear boundaries and blurry boundaries as shown in FIG. 14. In order to find blurry boundaries, investigation should be sufficiently carried out without passing by desired boundaries by controlling the movement speed of the corresponding contour. Thus, the level set function is deformed along an approximated delta function $\delta_\epsilon$ which has a value close to 1 as it is closer to the contour and has a value close to 0 as it moves away from the contour while having a value other than 0 only in the vicinity of $\epsilon$- of the contour (0-level of the level set function).

$$\frac{\partial \phi}{\partial t}(X) = F(\phi(X))\delta_\epsilon(\phi(X)),$$ [Equation 2]

$$\delta_\epsilon(\phi(X)) = \begin{cases} \dfrac{1 + \cos\left(\dfrac{\pi \phi(X)}{\epsilon}\right)}{2\epsilon} & \text{if } |\phi(X)| < \epsilon \\ 0 & \text{otherwise} \end{cases}.$$

Here, $F(\phi(X))$ denotes a force for deforming $\phi$ for segmentation, and will be specified later.

The detailed segmentation technique may be developed through the following two steps: (1) contrast emphasized image of the target and (2) equation for movement of contour.

(1) Contrast Emphasized Image of Target

Since a thickness of a z-axis is not large when 3D medical image data is obtained, the position of the target between upper and lower 2D images is not significantly changed. Accordingly, when using segmentation result information of the previous image in order to set an initial contour of a current image, the initial contour of the current image may be set to include contrast information of the target while it is positioned in the vicinity of the target. This assists in the improvement of a segmentation speed and an efficient segmentation process.

First, a function for calculating an averaging contrast of a given image in a region having a positive function value is defined as below.

$$m(\phi) = \frac{1}{\int_\Omega H(\phi(X))dX} \int_\Omega H(\phi(X))I(X)dX.$$ [Equation 3]

Here, $H(\bullet)$ denotes a Heaviside function which has 1 with respect to a positive variable and has 0 with respect to a negative variable.

Next, a function for emphasizing an image is defined.

$$J(X) = G_{\sigma_J} * \exp(-r(I(X)-M)^2), \quad G_{\sigma_J}: \text{Gaussian kernel},$$
$$\sigma_J, r \geq 0$$ [Equation 4]

This function has a value close to 1 when a contrast of a single pixel has a value approximated to M indicating the contrast of the target, and has a value close to 0 when the contrast of the single pixel has a value that is not approximated to M. This results in that the corresponding image appears bright when the contrast of the single pixel has a value similar to M and appears dark when the contrast of the single pixel has a value other than M. When M indicates the contrast of the target, J may be an image that emphasizes the contrast of the target. Accordingly, a relationship between the initial contour and the contrast of the target is roughly divided into three cases as below, and then Equation 3 is used. Here, M indicates the contrast of the target.

(i) A case in which an averaging contrast of the inside of the initial contour indicates the contrast of the target, $$M=m(\phi_0)$$

(ii) A case in which a bright contrast of the inside of the initial contour indicates the contrast of the target $$M=m(I-m(\phi_0))$$

(iii) A case in which a dark contrast of the inside of the initial contour indicates the contrast of the target $$M=m(-I+m(\phi_0))$$

In Equation 4, when a constant r is significantly large, only pixels having a contrast significantly similar to the contrast of the target may appear bright and most of pixels may appear dark, and when the constant r is significantly small, pixels having a contrast even slightly similar to the contrast of the target may appear bright. That is, r may determine the sensitivity concerning a difference with a target contrast, and an image for properly emphasizing a target image may be obtained by obtaining an appropriate value. For example, in a case of r=10, (ii) may be used, and in FIG. 15, a process of acquiring a contrast emphasized image of the target using (ii) is shown.

(2) Equation for Movement of Contour

Using the above-defined emphasized image, an evolution equation for a force and a level set function which are involved in the movement of the contour is derived. In order to properly find blurry boundaries of the target, a force that represents local properties of each pixel should be defined. Equation 5 represents a local force that is defined using a difference between an averaging contrast of the inside and outside of the contour which has been locally calculated in the vicinity of the pixel for the emphasized image and a contrast of the pixel itself.

$$F_l(J(X), \phi(X)) = -[J(X) - f_1(X)]^2 + [J(X) - f_2(X)]^2 \quad \text{[Equation 5]}$$

$$f_1(X) = \frac{[K_A * (H_\varepsilon(\phi)J)](X)}{[K_A * H_\varepsilon(\phi)](X)}, f_2(X) = \frac{[K_A * (H_\varepsilon(-\phi)J)](X)}{[K_A * H_\varepsilon(-\phi)](X)}$$

Here, $K_h$ denotes an averaging kernel having a kernel size of 2h+1, and determines a degree of local calculation. A function $H_\varepsilon$ uses an integrand of the approximated delta function used in Equation 2 as an approximated version of a Heaviside function.

$$H_\varepsilon(\phi(X)) = \begin{cases} \frac{1}{2}\left(1 + \frac{\phi(X)}{\varepsilon} + \frac{1}{\pi}\sin\left(\frac{\pi\phi(X)}{\varepsilon}\right)\right) & \text{if } |\phi(X)| < \varepsilon \\ 1 & \text{if } \phi(X) \geq \varepsilon \\ 0 & \text{if } \phi(X) \leq -\varepsilon \end{cases}$$

The following Equation 6 is an equation that represents a curvature of the corresponding contour and serves to keep an irregular shape of the contour more flat, thereby helping to prevent the deviation of the contour from desired boundaries.

$$F_r(\phi(X)) = \nabla \cdot \left(\frac{\nabla \phi(X)}{|\nabla \phi(X)|}\right). \quad \text{[Equation 6]}$$

Finally, an evolution equation for detailed segmentation is obtained as shown in Equation 7.

[Equation 7]

$$\frac{\partial \phi}{\partial t}(X) = [\lambda F_l(J, \phi) + \mu F_r(\phi) + \gamma g(I(X))]\delta_\varepsilon(\phi(X)), \gamma, \lambda, \mu \geq 0.$$

Here, a function g is a function that depends on an original image I, and defined as follows:

$$g(|\nabla I(X)|) = \frac{1}{1 + \tau|\nabla(G_\sigma * I)(X)|^2}, \tau \geq 0,$$

Since the function g has a value close to 0 on edges and has a value close to 1 in smooth regions other than the edges, it is called an edge indicator function (see FIG. 16A and FIG. 16B). When τ is increased, the function g is sensitive to even small changes in the contrast and thereby represents most of pixels as the edges. For the appropriate use of τ, only desired edges may be expressed as dark portions. For example, τ=1000 may be used. A value of $F_l$ that is a local force may become significantly small in the smooth regions so that evolution of the level set may stop in undesired regions, which may lead to a wrong result. The edge indicator function g has a large value only in the smooth regions, and therefore it is possible to prevent the contour from stopping in the undesired regions by inducing the movement of the contour in the smooth regions.

Figure 17:
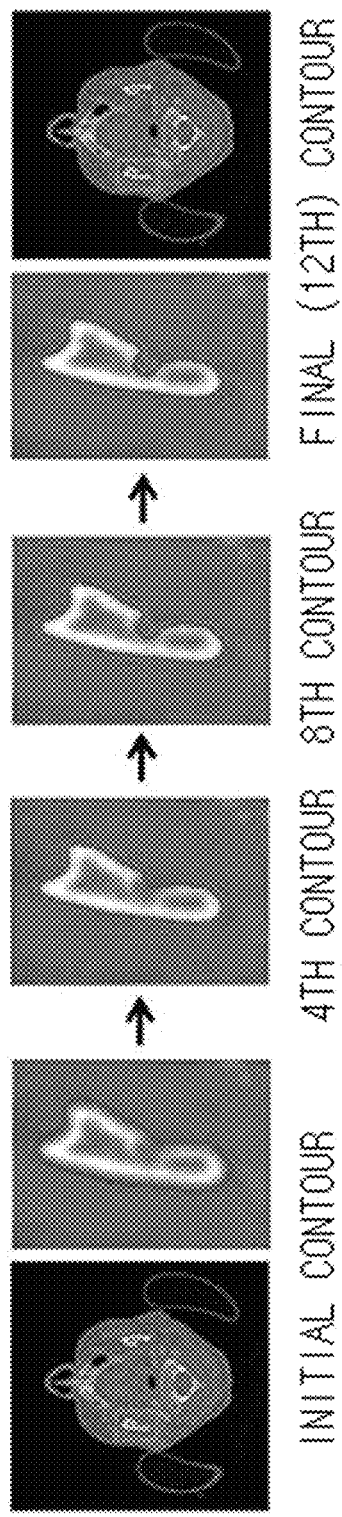
FIG. 17 is an example of a detailed segmentation process using a level set function.

Consequently, a first term ,$\lambda F_l(J,\phi)$ of Equation 7 denotes a local force that prevailingly exerts so as to evolve the level set function through a contrast comparison between the inside and outside of the contour which has been locally calculated, a second term $\mu F_r(\phi)$ thereof serves to make the contour flat, and a third term $\gamma g(I(X))$ thereof is introduced to prevent a stopping phenomenon of the contour due to the local force that becomes significantly small in the smooth regions. In addition, $\delta_\varepsilon(\phi(X))$ helps to carefully investigate the blurry boundaries by limiting a change region of the level set to the vicinity of ε- of 0-level. When the right side of Equation 7 approaches 0 so that there is no change in ,φ, 0-level set of ,φ represents a final segmentation result. FIG. 17 shows a detailed segmentation process using the level set function of Equation 7.

The 3D reconstruction unit 140 reconstructs the skin region and mandible extracted by the purpose region segmentation unit 130 as a 3D model.

Figure 18:
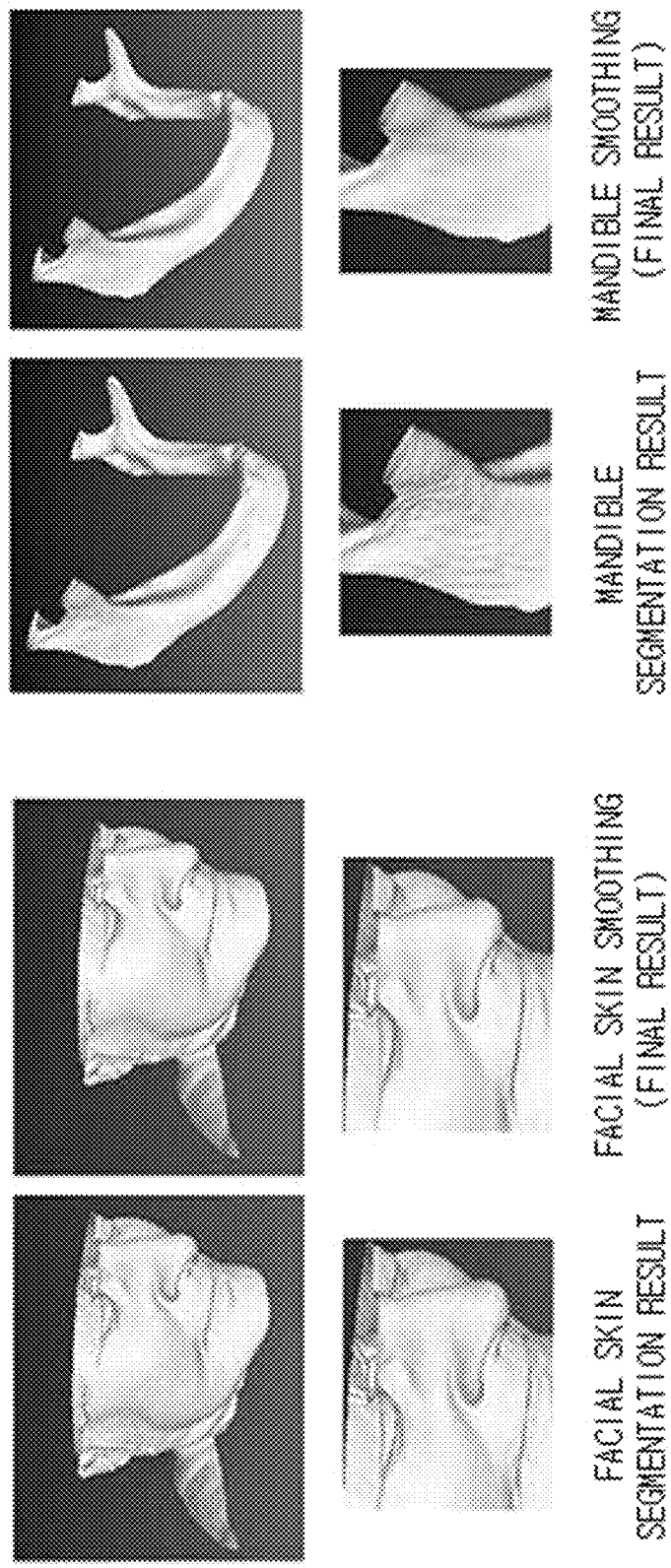
FIG. 18 is an example of 3D model reconstruction and smoothing results.

A level set function ,$\{u_k\}_{k=1}^K$ that represents the mandible as 0-level may be obtained through the purpose region segmentation unit 130. A 0-level iso-surface of this data may be reconstructed as the 3D model of the mandible using a marching cube algorithm. At this point, in order to eliminate a staircase phenomenon caused by a voxel size, the surface is subjected to smoothing treatment using the HC-Laplacian algorithm (see FIG. 18).

Figure 19:
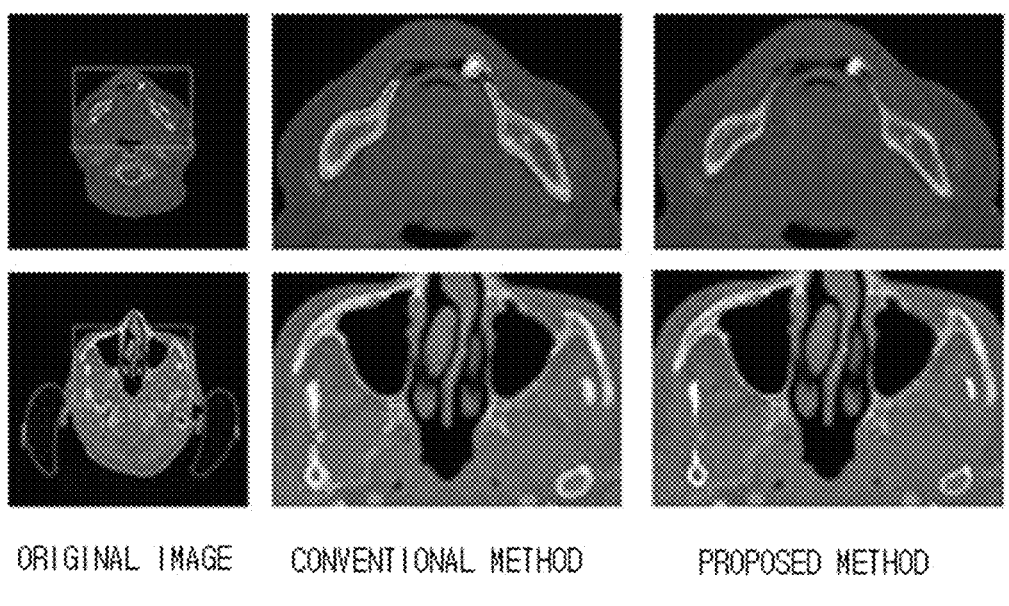
FIG. 19 is a diagram illustrating comparison between 2D images of a conventional segmentation method and a segmentation method according to an embodiment of the present invention.
Figure 20:
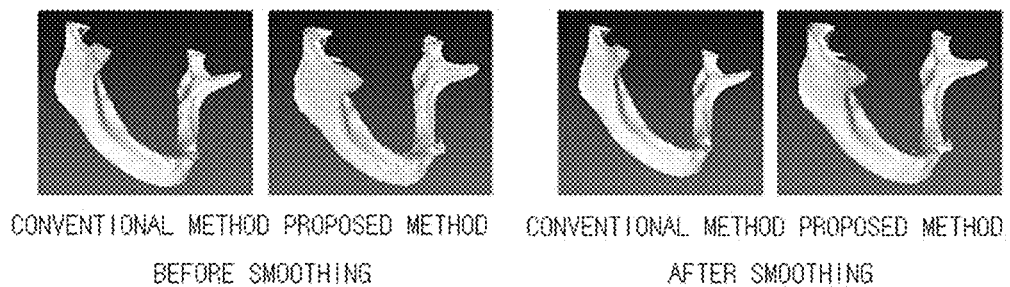
FIG. 20 is a diagram illustrating comparison between 3D models of a conventional segmentation method and a segmentation method according to an embodiment of the present invention.

In addition, FIGS. 19 and 20 show the superiority of the present invention compared to the conventional method.

The conventional method has the result obtained through a variety of post-processing after initial segmentation through iso-value adjustment using the Mimics software, and such a method has difficulties when a target having irregular boundaries is segmented. In the conventional method, the iso-value may be adjusted to be low in order to extract the blurry boundary, so that outer peripheral portions of the boundary of a desired target as well as even unnecessary portions around the blurry boundaries are likely to be extracted. On the other hand, the method proposed in the present invention may find only the boundary of the target in an appropriate position.

The control unit 150 controls operations of the image data reception unit 110, the multi-region segmentation unit 120, the purpose region segmentation unit 130, and the 3D reconstruction unit 140, and controls the flow of data thereof.

Figure 2:
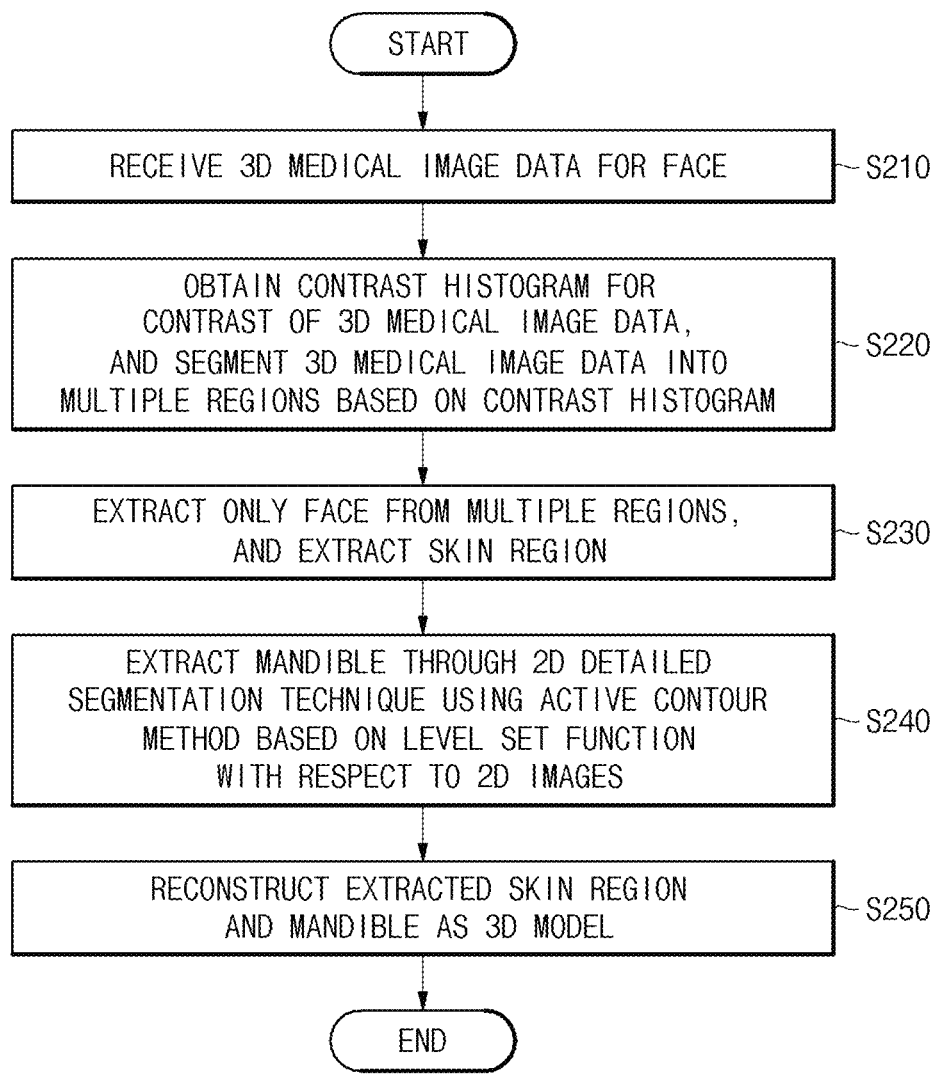
FIG. 2 is a flowchart illustrating a method for forming a three-dimensional (3D) model by automatic medical image segmentation, which is performed in the automatic image segmentation and model formation server of FIG. 1.

FIG. 2 is a flowchart illustrating a method for forming a 3D maxillofacial model by automatic medical image segmentation, which is performed in the automatic image segmentation and model formation server of FIG. 1.

In operation S210, the image data reception unit 110 receives 3D medical image data that is a set of 2D images. Here, the 3D medical image data may be a CBCT image.

In operation S220, the multi-region segmentation unit 120 obtains the contrast histogram for a contrast of the 3D medical image data, and segments the 3D medical image data into multiple regions based on the contrast histogram. Here, the multiple regions may be labeled according to the contrast. More specifically, the multi-region segmentation unit 120 divides a range of the contrast into 256 levels, and calculates the number of pixels having the contrast corresponding to each level from the 3D medical image data, and thereby obtains the contrast histogram. Next, a partial region having a peak satisfying a specific criterion is extracted using an AGMC (adaptive global maximum clustering) technique from the contrast histogram, and the 3D medical image data is segmented into the multiple regions based on an average value of the contrast histogram of the partial region.

In operation S230, the skin detailed segmentation module 131 of the purpose region segmentation unit 130 extracts a skin region by morphologically processing the multiple regions. More specifically, the skin detailed segmentation module 131 obtains a face candidate region by binarizing the multiple regions according to label values of the multiple regions, and erodes the face candidate region using a circular structural element having a radius value set based on a size of the face candidate region or a preset radius value. Next, the skin detailed segmentation module 131 restricts the eroded region of the face candidate region, extracts a connection component having a common portion with the eroded region, and then expands the eroded region again using the circular structural element.

In operation S240, the mandible detailed segmentation module 132 of the purpose region segmentation unit 130 automatically extracts the mandible through a 2D detailed segmentation technique using a level set function-based active contour method with respect to each of 2D images. More specifically, the mandible detailed segmentation module 132 extracts a segmentation result for a sample image among the 2D images, and extracts all of segmentation results for the remaining images using the segmentation result for the sample image. The segmentation result for each image is extracted through a process of setting the initial contour, emphasizing the contrast, and moving the contour.

In operation S250, the 3D reconstruction unit 140 reconstructs the skin region and the mandible extracted by the purpose region segmentation unit 130, as a 3D model. More specifically, the 3D reconstruction unit 140 reconstructs the skin region and the mandible as the 3D model using a surface rendering algorithm, and makes the surface of the reconstructed 3D model smooth using an HC-Laplacian algorithm As described above, according to the present invention, the skin and mandible of a patient may be automatically segmented and a 3D model may be generated by combining a multi-segmentation method and a detailed segmentation method using a level set function, thereby helping to establish more accurate and efficient surgical plan and obtain a uniform mandibular model of the patient. In other words, there is an effect capable of more efficiently establishing a surgical plan with less time.

In addition, through a 2D detailed segmentation technique, the method according to the present invention may be performed at a high speed while overcoming difficulties in the segmentation due to irregularities in the boundaries caused by high and low contrasts.

In addition, the mandible portion may be segmented by cross-sections in 2D medical images, and then, the segmentation results, that is, mandibular images extracted from each of the 2D medical images may be stacked to form a 3D model, thereby obtaining a more accurate 3D model of the mandible.

It should be apparent to those skilled in the art that various modifications can be made to the above-described exemplary embodiments of the present invention without departing from the spirit or scope of the invention. Thus, the present invention is intended to cover all such modifications provided they come within the scope of the appended claims and their equivalents.

What is claimed is:

1. A method for forming a three-dimensional (3D) model of skin and mandible by automatic medical image segmentation which is performed in an automatic image segmentation and model formation server, the method comprising:
 (a) receiving 3D medical image data that is a set of two-dimensional (2D) images for horizontal planes of a face;
 (b) obtaining a contrast histogram based on distribution of contrasts of the 3D medical image data, and segmenting the 3D medical image data for the face into multiple regions separated into at least one partial region based on the contrast histogram;
 (c) extracting only the face by removing portions other than the face from the multiple regions for the face, and extracting a skin region of the face;
 (d) extracting the mandible from each of the 2D images for the horizontal planes of the face through a 2D detailed segmentation technique using an active contour method based on a level set function; and
 (e) reconstructing the extracted skin region and mandible as the 3D model.

2. The method for forming the 3D model of claim 1, wherein the (b) obtaining of the contrast histogram includes dividing a range of the contrast into predetermined levels, and calculating the number of pixels having the contrast corresponding to each of the levels from the 3D medical image data for the face to thereby obtain the contrast histogram.

3. The method for forming the 3D model of claim 2, wherein the (b) obtaining of the contrast histogram further includes extracting, from the contrast histogram, a partial region having a peak satisfying a specific criterion using an AGMC (adaptive global maximum clustering) technique.

4. The method for forming the 3D model of claim 3, wherein the (b) obtaining of the contrast histogram further includes segmenting the 3D medical image data into the multiple regions based on an average value of the contrast histogram of the partial region.

5. The method for forming the 3D model of claim 1, wherein the (c) extracting of only the face and the skin region thereof includes obtaining a face candidate region by binarizing the multiple regions according to label values of the multiple regions.

6. The method for forming the 3D model of claim 5, wherein the (c) extracting of only the face and the skin region thereof further includes eroding the face candidate region using a circular structural element having a radius value set based on a size of the face candidate region or a preset radius value.

7. The method for forming the 3D model of claim 6, wherein the (c) extracting of only the face and the skin region thereof further includes restricting an erosion region reaching from a center of the face candidate region to positions laterally away from each other by a preset length.

8. The method for forming the 3D model of claim 7, wherein the (c) extracting of only the face and the skin region thereof further includes extracting a connection component having a common portion with the erosion region, and expanding the erosion region using the circular structural element.

9. The method for forming the 3D model of claim 1, wherein the (d) extracting of the mandible includes selecting a sample image from the 2D images, and extracting the mandible from the sample image that is a segmentation result for the sample image.

10. The method for forming the 3D model of claim 9, wherein the (d) extracting of the mandible further includes setting an initial contour of an image next to or prior to the sample image based on a contour for a segmentation result of the sample image.

11. The method for forming the 3D model of claim 10, wherein the (d) extracting of the mandible further includes emphasizing a contrast of the mandible based on contrast information about the mandible inside the initial contour.

12. The method for forming the 3D model of claim 11, wherein the (d) extracting of the mandible further includes stopping movement of the contour when the initial contour moves and reaches a boundary of the mandible.

13. The method for forming the 3D model of claim 12, wherein the (d) extracting of the mandible further includes the contour moving based on an average value of local contrasts of the inside and outside of the contour and a curvature of the contour.

14. The method for forming the 3D model of claim 1, wherein the (e) reconstructing of the extracted skin region and mandible includes reconstructing the extracted skin region and mandible as the 3D model using a surface rendering algorithm, and processing a surface of the 3D model using an HC-Laplacian algorithm.

15. The method for forming the 3D model of claim 1, wherein the 3D medical image data is CBCT (cone beam computed tomography) image data.

16. The method for forming the 3D model of claim 1, wherein the segmented multiple regions are labeled according to contrasts of the multiple regions.

17. An automatic image segmentation and model formation server which performs a method for forming a 3D model of skin and mandible by automatic medical image segmentation, the server comprising:
an image data reception unit that receives 3D medical image data that is a set of 2D images for horizontal planes of a face;
a multi-region segmentation unit that obtains a contrast histogram based on distribution of contrasts of the 3D medical image data, and segments the 3D medical image data for the face into multiple regions separated into at least one partial region based on the contrast histogram;
a purpose region segmentation unit that includes a skin detailed segmentation module for extracting only the face by removing portions other than the face from the multiple regions for the face and extracting a skin region of the face, and a mandible detailed segmentation module for extracting the mandible from each of the 2D images for the horizontal planes of the face through a 2D detailed segmentation technique using an active contour method based on a level set function; and
a 3D reconstruction unit that reconstructs the extracted skin region and mandible as the 3D model.

18. The automatic image segmentation and model formation server of claim 17, wherein the multi-region segmentation unit obtains the contrast histogram about the 3D medical image data, and segments the 3D medical image data into the multiple regions based on an average value of the contrast histogram of a partial region having a peak satisfying a specific criterion in the contrast histogram.

19. The automatic image segmentation and model formation server of claim 17, wherein the skin detailed segmentation module obtains a face candidate region from the multiple regions, erodes the face candidate region using a circular structural element based on a size of the face candidate region, restricts an erosion region based on a length of the face candidate region, extracts a connection component having a common portion with the erosion region, and expands the erosion region using the circular structural element.

20. The automatic image segmentation and model formation server of claim 17, wherein the mandible detailed segmentation module segments in detail an image next to or prior to a sample image based on a contour for a segmentation result of the sample image among the 2D images to thereby extract the mandible.

21. A non-transitory computer-readable recording medium that records a program capable of executing the method of claim 1 using a computer.

* * * * *